United States Patent
Vandayburg et al.

(10) Patent No.: US 6,737,189 B1
(45) Date of Patent: May 18, 2004

(54) ELECTROCHEMICAL CELL CONSTRUCTIONS AND METHODS OF MAKING THE SAME

(75) Inventors: Mark D. Vandayburg, North Olmsted, OH (US); Paula J. Hughes, Cleveland Heights, OH (US); Mark A. Schubert, Brunswick, OH (US); Nghia C. Tang, Olmsted Falls, OH (US); Katherine E. Ayers, Westlake, OH (US); Alan D. Ayers, Westlake, OH (US); John C. Bailey, Columbia Station, OH (US); Neal C. White, Hexham (GB)

(73) Assignee: Eveready Battery Company, Inc., Westlake, OH (US)

( * ) Notice: Subject to any disclaimer, the term of this patent is extended or adjusted under 35 U.S.C. 154(b) by 120 days.

(21) Appl. No.: 09/721,248

(22) Filed: Nov. 22, 2000

Related U.S. Application Data

(60) Provisional application No. 60/167,534, filed on Nov. 24, 1999.

(51) Int. Cl.[7] ............ H01M 6/06; H01M 10/04; H01M 10/28
(52) U.S. Cl. ............ 429/94; 429/126; 429/131; 429/137; 429/229
(58) Field of Search .............. 429/137, 229, 429/126, 131, 94

(56) References Cited

U.S. PATENT DOCUMENTS

| | | |
|---|---|---|
| 1,560,798 A | 11/1925 | Harris |
| 2,424,149 A | 7/1947 | Chaplin ............ 136/107 |
| 2,605,298 A | 7/1952 | Marsal et al. ............ 136/107 |
| 2,823,246 A | 2/1958 | Lang |
| 2,960,558 A | 11/1960 | Marsal et al. ............ 136/107 |
| 3,071,638 A | 1/1963 | Clark et al. |
| 3,156,585 A | 11/1964 | Yamano et al. |
| 3,753,779 A | 8/1973 | Franko et al. |
| 4,226,920 A | 10/1980 | Armstrong |
| 5,472,806 A | 12/1995 | Meintjes |
| 5,677,080 A | 10/1997 | Chen |
| 5,869,205 A | 2/1999 | Mick et al. |
| 5,910,366 A * | 6/1999 | Chowdhury et al. |
| 5,916,514 A | 6/1999 | Eshraghi |
| 6,203,941 B1 * | 3/2001 | Reichert et al. ............ 429/137 |

FOREIGN PATENT DOCUMENTS

| | | | |
|---|---|---|---|
| DE | 55781 | 3/1891 | |
| EP | 0 312 330 | 4/1989 | ............ H01M/4/12 |
| FR | 589 729 | 6/1925 | |
| FR | 2622359 | 4/1989 | |
| GB | 150848 | 9/1920 | |
| GB | 1 387 073 | 3/1975 | ............ H01M/6/08 |

OTHER PUBLICATIONS

Evaluation of the Electrochemical Characteristics of Poly-(Vinyl Alcohol)Poly(Acrylic Acid) Polymer Blend; Catherine O. Dasenbrock, Thomas H. Ridgeay, Carl J. Seliskar and William R. Heineman; Electrochimica Acta., vol. 43, No. 23, pp 3497–3502, 1998 (no month).

Gel Formation of Polyacrylic Acid in Dilute Aqueous Solutions via Radiation Crosslinking; S. Zhu, R.H. Pelton and A.E. Hamielec; Eur. Polym. J. vol. 34, No. 3/4, pp 487–492, 1998 (no month).

Allyl Endcapped Polyethylene Oxide Crosslinkers and Their Use in Superabsorbents; P.B. Smith, S.S. Cutte, D.E. Henton, C. Powell, J. Kosman, B.A. Howell; 1997 John Wiley & Sons, Inc. pp 799–806 no month.

* cited by examiner

Primary Examiner—John S. Maples
(74) Attorney, Agent, or Firm—Robert W Welsh

(57) ABSTRACT

A method of making electrochemical cells with high anode-to-cathode interfacial surface area and improved discharge efficiency at high rate discharge, without sacrificing total capacity involves the use of a separator coated electrode, and a flowable material comprising a second electrode. The first electrode and flowable material comprising the second electrode are disposed in a cell housing. The flowable material surrounds the coated surfaces of the first electrode. The invention also provides simplified methods for making electrochemical cells having a high anode-to-cathode interfacial surface area.

6 Claims, 2 Drawing Sheets

ELECTROCHEMICAL CELL
CONSTRUCTIONS AND METHODS OF
MAKING THE SAME

RELATED APPLICATION

The present invention claims the benefit of U.S. Provisional Application Serial No. 60/167,534 entitled "Electrochemical Cell Constructions and Methods of Making the Same" and filed Nov. 24, 1999.

FIELD OF THE INVENTION

This invention relates to the field of electrochemical cells, and more particularly to electrochemical cells having very high anode-to-cathode interfacial surface area, and therefore, high rate discharge efficiency.

BACKGROUND OF THE INVENTION

Electrochernical cells are commonly employed to supply voltage for electrically operated devices, and particularly for portable electrically operated devices. Popular alkaline cells of the generally cylindrical type are commercially available in industry standard sizes including D-, C-, AA-, AAA-, and AAAA- cells. There is an increasing demand for alkaline cells, particularly alkaline cells of the commonly commercially available sizes, which exhibit improved discharge efficiency at high discharge rates.

A frequently used configuration for high discharge rate batteries is a spiral wound electrode assembly, also known as a jelly-roll type assembly, in which a positive electrode, a negative electrode, and a separator sheet, are spirally wound to provide a high surface area between the electrodes, whereby a high discharge rate is achievable. The spiral wound construction requires that the electrodes be provided with a separator to avoid shorting. If conventional separators, such as paper or cellulose separators are used, typically, approximately 10% to 20% of the total volume of a AA size jelly-roll cell with a 110 square centimeter anode-to-cathode surface area is consumed by non-active separator material. The increased interfacial surface area results in increased high rate capacity. However, the reduction in active material volume causes reduced capacity at low rates of discharge.

Another disadvantage with conventional spiral wound cell constructions, is that the machines used for spirally winding two electrodes and a separator are relatively expensive to fabricate, operate and maintain. Accordingly, improved methods and cell constructions are desired.

U.S. Pat. No. 5,869,205, assigned to Eveready Battery Company, Inc., the assignee of this invention, discloses an electrochemical cell having multiple anode compartments to increase anode-to-cathode interfacial area. One embodiment includes a first electrode disposed in a container, in which the first electrode includes four cylindrically shaped cavities, with a second electrode disposed within each of the four cavities. A conventional separator is disposed within each of the four cavities. While the cell configuration described in U.S. Pat. No. 5,869,205 achieves a substantial improvement in high rate capacity, conventional separators are used. Accordingly, the improved discharge efficiency at high discharge rates, which is associated with an increase in anode-cathode interfacial surface area, is also accompanied by a proportional increase in separator area and separator volume. Therefore, improved discharge efficiency at high discharge rates is achieved, at least in part, by sacrificing total capacity. It would be desirable to achieve even greater improvements in discharge efficiency at high discharge rates, and preferably to achieve such improvements without sacrificing total capacity.

U.S. Pat. No. 3,156,585 discloses a hermetically sealed storage battery comprising a plurality of concentrically arranged ring-shaped electrodes, each of which is separated from an adjacent electrode by a conventional separator. Although the patent does not specifically mention improved discharge efficiency at high discharge rates, the battery construction shown would be expected to have an increased anode-cathode interfacial surface area, and would be expected to exhibit at least some improvement in discharge efficiency at high discharge rates. However, the battery structure is extremely complicated, and would be difficult to manufacture at a competitive price. Any improvement in discharge efficiency at high discharge rates would be accompanied by a significant increase in separator area and volume, and, therefore, a significant decrease in total capacity. It would be desirable to provide alkaline cells having increased anode-to-cathode interfacial area, and which are simpler in design, and, therefore, less expensive, and which preferably achieve improved discharge efficiency at high discharge rates without sacrificing total capacity.

U.S. Pat. No. 6,326,102 B1, issued Dec. 4, 2001 and commonly owned by the assignee of this invention, discloses a high rate electrochemical cell comprising a first electrode of a first polarity disposed in a container, a second electrode of a second polarity disposed on one side of the first electrode, a first current collector disposed in contact with the first electrode, and an outer electrochemically active layer having the second polarity and being disposed on another side of the first electrode. A separator is disposed between the first electrode and the second electrode and between the second electrode and the outer electrochemically active layer. The construction disclosed in U.S. application Ser. No. 09/198,802 has the advantage of achieving a substantial increase in anode-to-cathode interfacial surface area, and hence an improvement in discharge efficiency at high discharge rates, using a relatively simple design which can be produced at a competitive price. However, because the separator between the first and second electrode and between the second electrode and the outer electrochemically active layer is a conventional separator, i.e., a separator typically having a thickness of several mils, the improved discharge efficiency at high discharge rates is accompanied with an increase in separator volume, and, therefore, a decrease in total capacity.

SUMMARY OF THE INVENTION

The invention pertains to batteries having high anode-to-cathode interfacial surface area, and improved discharge efficiency at high discharge rates. The invention also provides methods for making batteries having high anode-to-cathode interfacial surface area, and improved discharge efficiency at high discharge rates.

A battery in accordance with this invention includes a housing and a first electrode. The first electrode includes a coating on surfaces of the first electrode, wherein the coating functions as a separator. The coated first electrode is disposed in the housing. A flowable material comprising a second electrode material is also disposed in the cell housing. The flowable material surrounds the coated surfaces of the first electrode .

A method of this invention involves the steps of providing a first electrode, forming on a surface of the first electrode a coating which functions as a separator, disposing the coated first electrode in a housing, and disposing a flowable material comprising a second electrode material in the housing, with the flowable material surrounding the coated surface of the first electrode.

DESCRIPTION OF THE PREFERRED EMBODIMENTS

Figure 1:
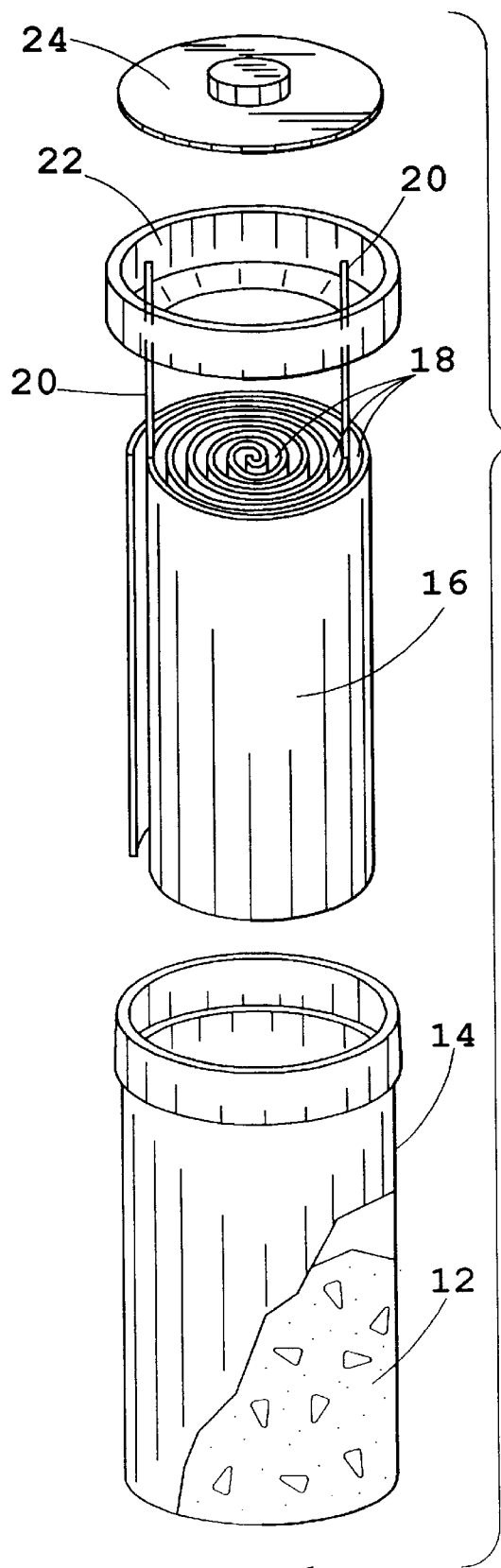
FIG. 1 is an exploded perspective view of a spirally wound electrochemical cell in accordance with the invention.

The invention pertains to electrochemical cells having a relatively high anode-to-cathode interfacial surface area, improved discharge efficiency at high discharge rates, and methods of preparing the same. The methods of this invention generally involve the use of a first electrode or electrode material which is provided with a coating that functions as a separator, and the use of a flowable electrode material which flows around and contacts the coated electrode. Accordingly, the expression "flowable electrode material" refers to an electrode material having the ability to flow around and completely surround a solid electrode. Such materials generally comprise a mixture of a liquid electrolyte and dispersed solid particles of an electrochemically active material. The flowable electrode may be a low viscosity, material such as a liquid or a relatively high viscosity material such as a paste. Alternatively, the flowable electrode may be a powder. This combination of features makes it possible to prepare electrochemical cells having very high anode-to-cathode interfacial surface area and relatively low separator volume. In fact, the principles of this invention can be employed to achieve a substantial increase in anode-to-cathode interfacial area and, therefore, a substantial improvement in discharge efficiency at high discharge rates, as compared with conventional cylindrical alkaline cells having a bobbin type cell construction wherein an anode is disposed within a cylindrical volume centrally formed in a cathode disposed adjacent an inner wall of a steel can defining the electrochemical cell, while maintaining, or even increasing, total cell capacity.

The separator coating is a thin film or layer of material which is formed on the surface of the electrode. The coating is at least initially secured to the surface of the electrode by mechanical, chemical or electrical forces. After the cell has been assembled, the coating may no longer remain secured to the electrode surface. In contrast, conventional separator materials are carefully converted into a dry free-standing film prior to placing the separator adjacent the surface of an electrode. Conventional separators conform to the surface of the electrode on a macroscopic scale and thus are not capable of forming uniformly thick layers on the surface of an irregularly shaped electrode. Separator coatings are also distinguished from conventional separator materials by the fact that separator coatings are initially bound to the electrode surface along the entire interfacial area between the separator and electrode. It is not necessary for the separator material to remain bound to the electrode after the cell has been assembled.

Examples of suitable separator coatings include coatings formed by applying a polymeric coating composition to the electrode or electrode material and converting the polymeric coating composition into a polymer film. Such polymeric coating compositions can be prepared by dissolving a polymer, such as cellulose, in a solvent. Suitable separator coatings can also be formed by polymerizing the separator coating directly on surfaces of an electrode. A more detailed description of various separator coatings which may be suitable for use with the invention are set forth in U.S. patent application Ser. No. 09/410,300 filed Sep. 30, 1999, entitled "Electrochemical Cells Having Ultra Thin Separators And Methods Of Making The Same," assigned to the assignee of this invention, the entire content of which is incorporated herein by reference.

Preferably, the separator coatings or films used in this invention have a thickness of about 100 microns or less, and more preferably a thickness of less than 60 microns, even more preferably less than 40 microns, and most preferably less than 30 microns. Because of the substantial reduction in thickness of the separator coatings used herein, as compared with conventional paper separators (typically having a thickness of at least 200 microns), it is possible to substantially increase the anode-to-cathode interfacial surface area while reducing total separator volume. Accordingly, the use of separator coatings having a thickness of less than 100 microns, less than 60 microns, less than 40 microns, or less than 30 microns, will allow production of electrochemical cells simultaneously exhibiting improved discharge efficiency at high discharge rates, and increased total discharge capacity. For example, a separator coating having a thickness of 25 microns would facilitate production of a AA size electrochemical cell having about 10 times the anode-to-cathode interfacial surface area of a conventional AA size battery design using a bobbin type configuration with a 250 micron separator, without decreasing total capacity. Alternatively, the thinner separator coatings can be used to make electrochemical cells having a combination of increased anode-to-cathode interfacial surface area, improved discharge efficiency at high discharge rates, and higher total capacity.

In addition to facilitating the production of thinner separators, the use of a separator coating formed directly on the surface of an electrode makes it practical to construct electrochemical cells with electrodes having highly irregular shapes and a high surface area. This is in contrast to conventional paper and cellophane separators which can, in general, only conform with planar and smoothly curved electrode surfaces. More specifically, the inability to conform conventional paper and cellophane separators to irregular surfaces has limited their use to electrochemical cells having plate electrodes, ribbon electrodes and cylindrically shaped electrodes. An attempt to conform conventional paper or cellophane separators to an irregularly shaped electrode will generally cause the separator to become folded upon itself and occupy an unacceptably high portion of the volume of an electrochemical cell, whereas the separator coatings used in this invention can be formed directly on irregularly shaped surfaces of an electrode to achieve a substantially uniformly thin separator which does not occupy an unacceptably large volume in an electrochemical cell.

Another important feature of this invention is the use of a flowable second electrode material which is capable of flowing around and surrounding the surfaces of an irregularly shaped, non-symmetrically shaped and/or non-cylindrically shaped separator coated first electrode. An example of an electrode having a non-symmetrical and a non-cylindrical shape is a spirally wound electrode or a dendritic zinc electrode (which is described later herein). The use of a separator coated electrode in combination with a flowable second electrode material provides an economical way for producing electrochemical cells having a very high anode-to-cathode interfacial surface area, and, therefore, an improved discharge efficiency at high discharge rates, without sacrificing total discharge capacity.

An embodiment of the invention is shown in FIG. 1. In accordance with this embodiment, an electrochemical cell 10 is constructed by depositing a flowable electrode material 12 into a can or housing 14 and inserting a spirally wound, separator coated electrode 16 into can 14. As spirally wound electrode 16 is inserted into can 14, flowable electrode material 12 flows upwardly filling spaces 18 defined by spirally wound electrode 16 and completely surrounds the surfaces of spirally wound electrode 16. Electrically conductive leads 20 may be attached to the upper end of spirally wound electrode 16 either before or after spirally wound electrode 16 is inserted into can 14. Electrochemical cell 10 is completed in a conventional manner with a seal 22 and a cover 24.

The electrochemical cell construction shown in FIG. 1 eliminates various problems associated with conventional methods of manufacturing spirally wound or jelly-roll electrochemical cells. Spirally wound electrochemical cells are conventionally produced by winding an anode and cathode together with a first separator disposed between the anode and the cathode. In a conventional process the separator and electrodes must be properly aligned before winding of the electrodes and separator. By forming a separator directly on at least one of the electrodes, the need for aligning the separator with the electrodes is eliminated, and the need for aligning a first electrode with a second electrode is eliminated. This simplifies battery assembly, and, thereby, reduces the cost of fabricating a spirally wound battery. Equipment for winding a single web is less expensive than equipment for simultaneously winding and aligning three or more webs. The anode is generally a metal foil, and the cathode is generally a composite material comprised of a particulate electrode material and a binder. In order to allow spiral winding of the cathode with the anode, the binder must be flexible. Additionally, conventional machines for winding a cathode and anode together are more expensive than machines used for winding a foil anode alone. Accordingly, the electrochemical cell construction shown in FIG. 1 eliminates the need for expensive jelly-roll winding machines and eliminates the need for a flexible binder in the cathode material. Thus, the construction shown in FIG. 1 allows spirally wound electrochemical cells to be produced less expensively. Additionally, the separator coatings on each side of the spirally wound ribbon electrode can be thinner and occupy less volume than conventional paper or cellophane separators, thereby facilitating production of spirally wound electrochemical cells having higher anode-to-cathode interfacial surface area and/or increased total capacity.

The flowable anode material can be comprised of a mixture of zinc, a binder, potassium hydroxide, water, and optionally, a gelling agent.

As an alternative, the electrochemical cell shown in FIG. 1 can be made by first inserting the spirally wound electrode 16 into can 14, and thereafter depositing electrode material 12 into can 14 so that it flows around and between the surfaces of electrode 16 and can 14.

Figure 2:
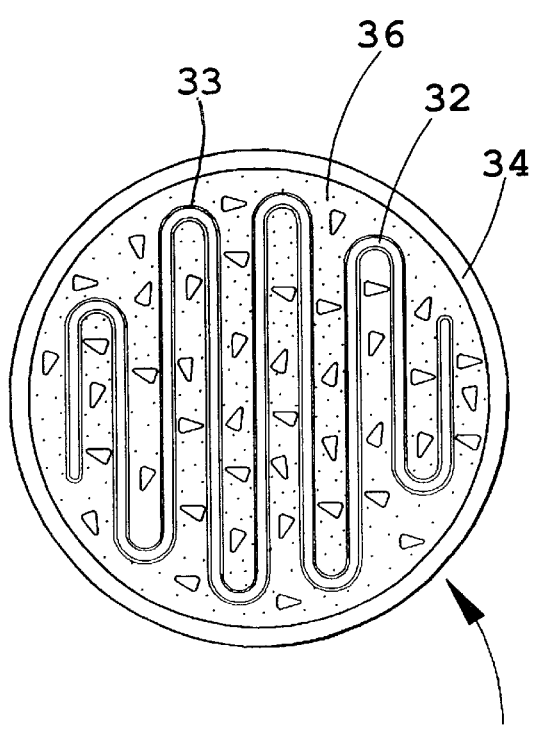
FIG. 2 is a schematic cross-sectional view of an electrochemical cell having a ribbon electrode folded in a zigzag pattern in accordance with the invention.

In an alternative embodiment similar to that shown in FIG. 1, an electrochemical cell 30 shown in FIG. 2 includes a ribbon electrode 32 having a separator coating 33 folded in a zigzag fashion. Folded electrode 32 is inserted into can 34 and is surrounded by a flowable electrode material 36. Electrode material 36 may be deposited into can 34 before or after separator coated electrode 32 is inserted into can 34.

In further alternative embodiments, the first electrode may comprise a porous fixed network of an electrochemically active material, such as zinc, or a porous fixed network of an electrically conductive material, such as brass, on which is deposited an electrochemically active material, such as zinc. Examples, such as metal foams and "dendritic zinc" are described below.

Figure 3:
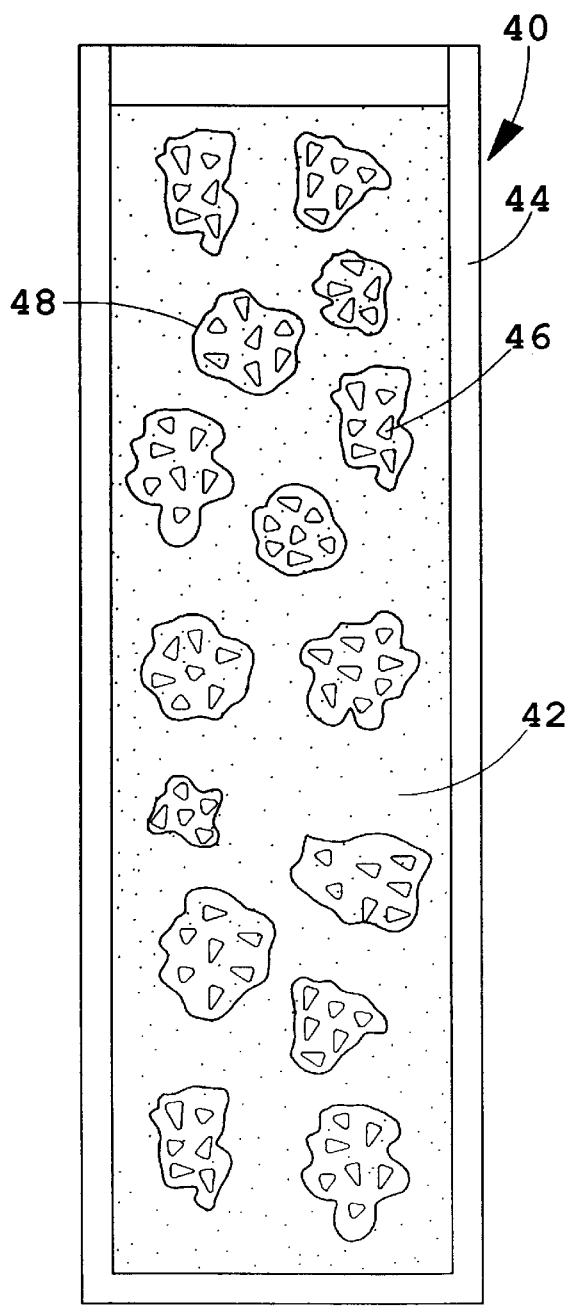
FIG. 3 is a schematic longitudinal cross-sectional view of an electrochemical cell having a porous metal electrode in accordance with the invention.

As shown in FIG. 3, an electrochemical cell 40 comprises a separator coated porous metal (such as zinc) electrode 42 inserted in can 44. Porous or reticulated electrode 42 can be a metal foam or sintered metal electrode. Metal foams may be produced by a variety of known methods. For example, a molten metal may be placed under high pressure so that it dissolves a non-reactive gas. When the pressure is released and the metal is allowed to cool, the dissolved gas escapes and leaves open-celled pores in the metal body. In another process, foaming agents may be added to molten metal. Another process mixes monomers with metal particles and heats the mixture to induce foaming and solidification of the resin. In another process metal particles can be compressed in a conventional manner under suitable conditions of elevated temperature and pressure to form an anode having a desired shape. The temperature and pressure employed are not particularly critical provided complete sintering and coalescence of the particles does not occur. Temperatures at approximately the sintering temperature of the metal at the pressures employed are preferred. Alternatively, the metal particles can be dry mixed with a powdered resinous binder such as polytetrafluoroethylene. The admixture of metal particles and binder may be compressed in a conventional manner, again under suitable conditions of elevated temperature and pressure to form an anode having the desired shape. The temperature depends upon the resin selected and the pressure applied which is normally at from about 250 to 25,000 pounds per square inch.

Another method of fabricating an electrode having an open-pore structure involves depositing a metal by arc vapor deposition on and in an openwork synthetic-resin pyrolyzable support by juxtaposing the support with a pair of electrodes at least one of which is composed of at least one element of the selected metal. The electrodes are advanced into contact to strike an electric arc between the electrodes and evaporate the metal from one of the electrodes and effect deposition of the metal on the support. The space in which the support is juxtaposed with the electrodes is evacuated prior to or during deposition of the metal, whereby a fraction of a total amount of the metal adapted to ultimately form the open-pore structure is deposited in the form of a coating. In a spray-deposition operation, a quantity of the metal sufficient to make up the remainder of the total amount is sprayed onto the support and/or the coating. Thereafter, the support is pyrolyzed to form an openwork skeleton consisting essentially of the metal. In a final step, the metal skeleton is sintered into a coherent body constituting an open-pore structure. Further details of this method are set forth in U.S. Pat. No. 5,011,638.

The reticulated or porous metal electrode (e.g., metal foam, sintered metal, etc.) is provided with a separator coating in accordance with any of the techniques set forth in WO 01/24291 that published on Apr. 5, 2001 and claims benefit of U.S. patent application No. 09/410,300 filed Sep. 30, 1999. Thereafter, separator coated porous electrode 42 is inserted into can 44 and surrounded by flowable electrode material 46 which flows around and into the pores 48 of porous electrode 42.

Figure 4:
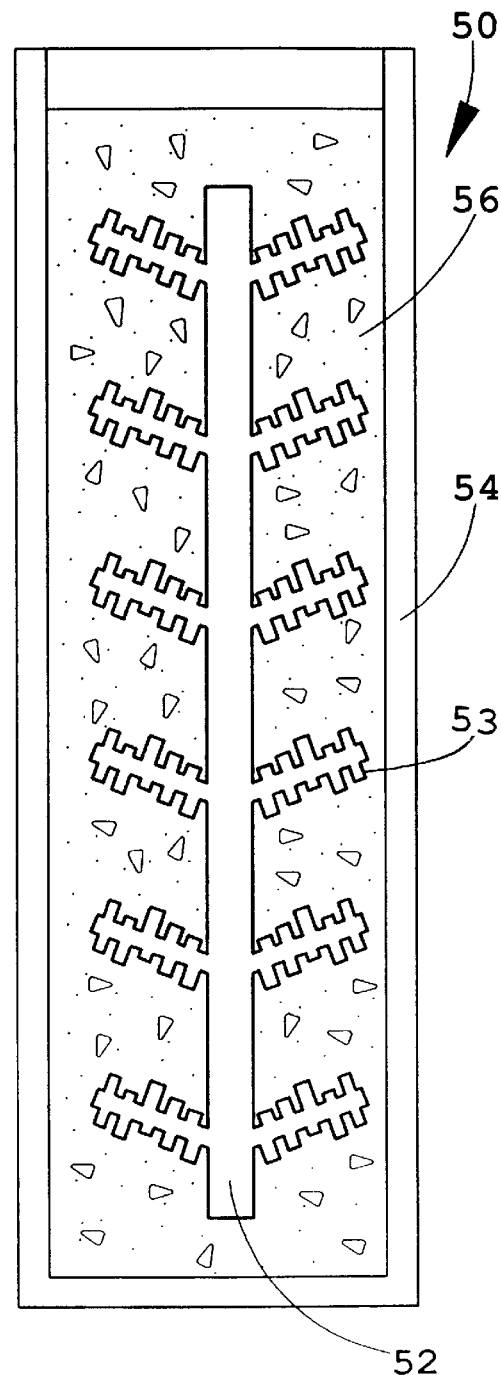
FIG. 4 is a schematic longitudinal cross-sectional view of an electrochemical cell including an electrode having a three-dimensional fractal structure in accordance with the invention.

In accordance with another embodiment shown in FIG. 4, an electrochemical cell 50 includes a three-dimensional tree-like structure 52 of a metal, such as a material known as "dendritic zinc", which resembles the veins of a leaf, and which is coated with a separator. The electrode 52 which has a separator coating 53 is immersed in a can 54 containing a slurry of cathode mix 56. Methods for preparing suitable dendritic zinc electrodes are disclosed in U.S. Pat. Nos. 3,071,638 and 3,753,779 which are incorporated herein.

Many modifications and variations of the present invention are possible in light of the above teachings. It is therefore to be understood that, within the scope of the appended claims, the invention may be practiced otherwise than as specifically described.

What is claimed is:

1. A battery comprising:

a housing having an interior wall;

a first electrode comprising a surface and disposed in the housing, said first electrode includes a spirally wound strip including an electrically active material, the first electrode's surface coated with a separator material formed thereon; and a flowable mixture of a second electrode material dispensed in the housing such that the flowable mixture flows around the coated first electrode and between the first electrode and the interior wall of the housing.

2. A battery comprising:

a housing having an interior wall;

a plurality of first electrodes, each comprising a surface coated with a separator material formed thereon and disposed into the housing; and a flowable mixture of a second electrode material dispensed in the housing such that the flowable mixture flows around the coated first electrodes and between the first electrodes and the interior wall of the housing.

3. A battery comprising:

a housing having an interior wall;

a first electrode comprising a surface and disposed in the housing, the first electrode's surface coated with a separator material formed thereon, said first electrode includes at least one zinc ribbon; and a flowable mixture of a second electrode material dispensed in the housing such that the flowable mixture flows around the coated first electrode and between the first electrode and the interior wall of the housing.

4. A battery comprising:

a housing having an interior wall;

a first electrode comprising a surface and disposed in the housing, the first electrode's surface coated with a separator material formed thereon wherein the first electrode has a non-symmetrical shape; and a flowable mixture of a second electrode material dispensed in the housing such that the flowable mixture flows around the coated first electrode and between the first electrode and the interior wall of the housing.

5. A battery comprising:

a housing having and interior wall;

a first electrode comprising a surface and disposed in the housing, the first electrode's surface coated with a separator material formed thereon wherein the first electrode comprises a porous fixed network of an electrically conductive material on which is deposited an electrochemically active material; and a flowable mixture of and electrode material dispensed in the housing such that the flowable mixture flows around the coated first electrode and between the first electrode and the interior wall of the housing.

6. The battery of claim 5, wherein the electrochemically active material is zinc.

* * * * *